April 2, 1957     D. J. HANSEN     2,787,286
REGULATOR FOR PRESSURIZED GASEOUS FUEL
Filed Oct. 3, 1952     3 Sheets-Sheet 1
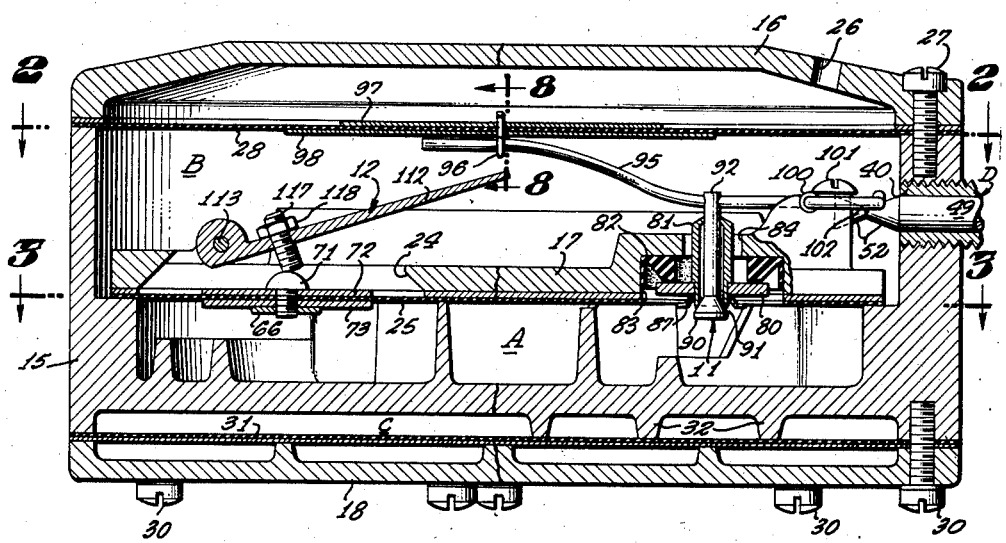
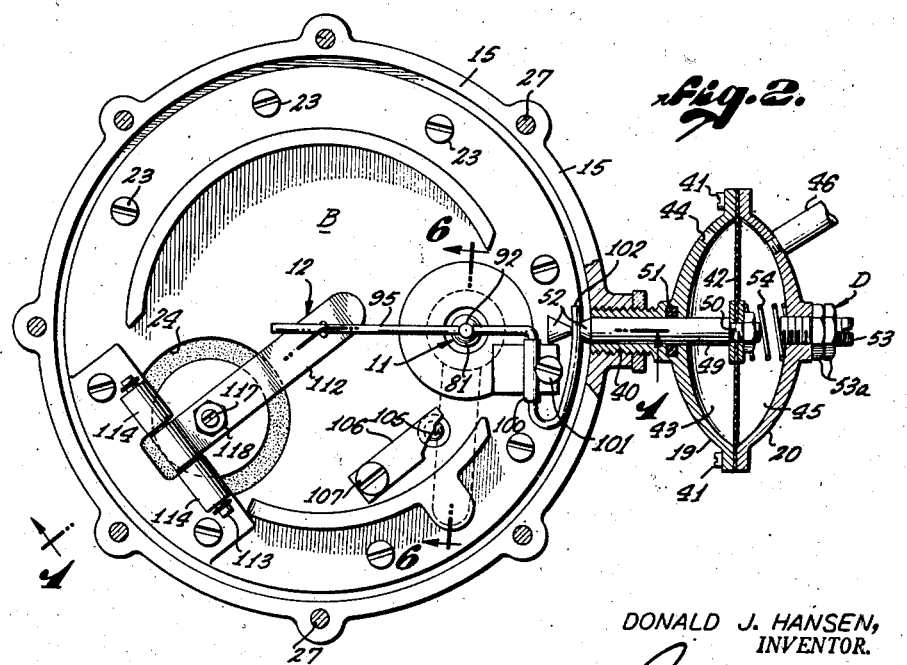
DONALD J. HANSEN,
INVENTOR.
BY
ATTORNEY.

April 2, 1957 D. J. HANSEN 2,787,286
REGULATOR FOR PRESSURIZED GASEOUS FUEL
Filed Oct. 3, 1952 3 Sheets-Sheet 2
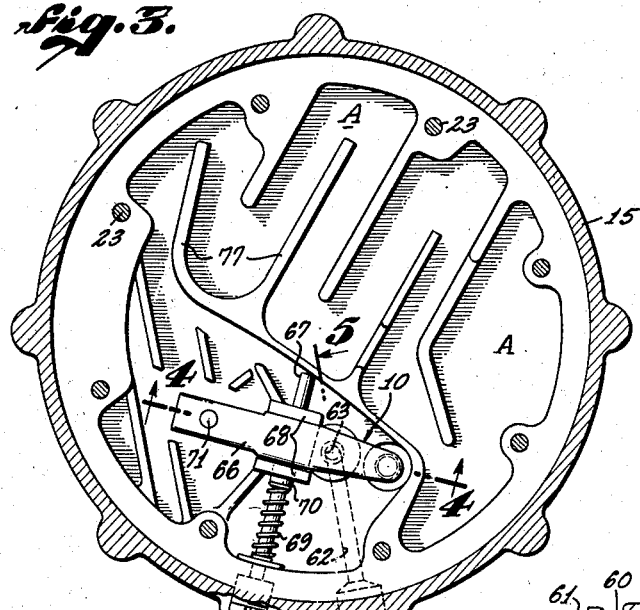
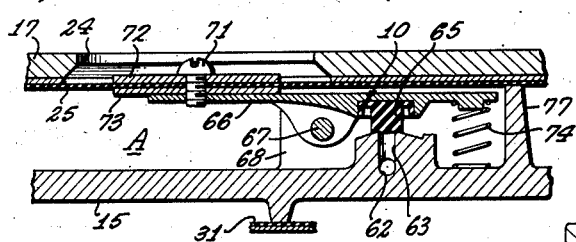
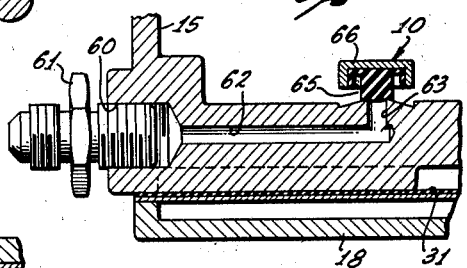
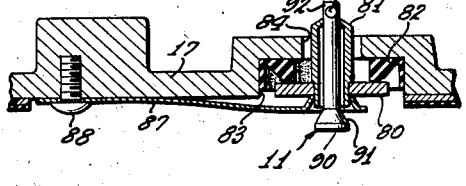
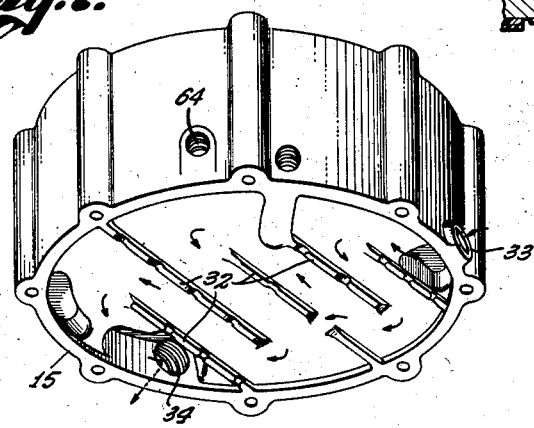
DONALD J. HANSEN,
INVENTOR.
BY
ATTORNEY.

United States Patent Office 2,787,286
Patented Apr. 2, 1957

2,787,286

REGULATOR FOR PRESSURIZED GASEOUS FUEL

Donald J. Hansen, Inglewood, Calif.

Application October 3, 1952, Serial No. 313,034

24 Claims. (Cl. 137—495)

This invention relates to devices for controlling the flow and pressure of fluid, with special reference to devices for releasing fluid from a high pressure source with controlled pressure reduction. While the invention is widely applicable for its basic purpose, it has been initially embodied in a regulator for dispensing gaseous fuel from a high pressure source to a fuel consuming device in the form of an internal combustion engine having the usual carburetion intake and having the usual intake manifold. For the purpose of disclosure and to illustrate the principles involved, this embodiment will be described in detail and will provide adequate guidance for those skilled in the art who may have occasion to apply the same principles to other specific purposes.

A regulator of the present type includes a primary chamber having an inlet port for communication with the high pressure fuel source, a pressure-responsive inlet valve that tends to limit the pressure in the primary chamber to a predetermined magnitude, and, finally, some means for releasing fluid from the primary chamber to meet the fuel demands of the engine. In a typical regulator, the means for controlling the release of fluid from the primary chamber includes a secondary chamber in communication therewith and a release valve that is responsive to pressure changes in the secondary chamber, the secondary chamber being connected to the intake of the engine for pressure response in accord with the changing fuel requirements of the engine.

The basic requirements for the efficient operation of such a regulator are well recognized. One requirement is that the regulator provide for effectively closing the inlet valve when the regulator is not meeting a fuel demand so that there will be no leakage of fuel to the engine when the engine is idle. Another requirement is that the regulator have adequate flow capacity to meet the maximum or peak demands of the engine. A further requirement is that the pressure of the fuel stream be accurately regulated over the whole range of magnitudes of fuel demand and especially in the range of lower magnitudes where close regulation is the most difficult to achieve. A still further requirement, which is closely related to the requirement for accurate control, is that the various valves operate easily to respond to relatively small control forces. Also, of primary importance in the operation of an engine, is the requirement that the regulator provide for a constant minimum fuel flow of predetermined magnitude for running the engine at idling speed, when desired.

In approaching the problem of meeting these requirements in the construction of a regulator of this type, certain conflicting considerations are encountered. One such conflict arises, for example, in the construction of the release valve that controls the flow of fluid from the primary chamber into the secondary chamber for conveyance to the engine intake. To prevent leakage when the engine is out of operation, it is essential to employ a valve of the self-sealing type having a pressure-responsive area of effective magnitude exposed to the pressure of the primary chamber to exert sealing pressure on the movable parts of the valve. The difficulty is that a pressure-responsive area of sufficient size to preclude leakage creates a strong force that must be dealt with in the initial opening of the valve. It is possible of course to use a stronger force to open the valve, but low magnitude valve operating forces are desirable for accurate regulation. The present invention resolves this conflict by providing, in effect, two release valves or a dual valve comprising a main release valve and a smaller auxiliary release valve. The arrangement is such that the relatively small auxiliary release valve opens in advance of the main release valve and thereby creates local reduction of the normal back pressure that opposes opening of the main valve. Since relatively little force is required to open the auxiliary valve and the opening of the auxiliary valve reduces the magnitude of force required for subsequent opening of the main valve, only moderate valve opening force is required and the resulting valve action is exceptionally smooth.

A second conflict arises between the requirement for high capacity flow to meet peak fuel demands and the requirement for accurate regulation over the whole range of demands. The usual provision for meeting the maximum contemplated fuel demand of an engine is to provide an inlet valve arrangement for the primary chamber that tends to maintain a relatively high primary chamber pressure so that the resulting high pressure differential between the primary chamber and the secondary chamber may be utilized to the full when required by a peak fuel demand. The normal pressure in the primary chamber for this purpose may range as high as 10 to 20 lbs. per square inch above atmospheric pressure. The difficulty, however, is that such a relatively large pressure differential inherently makes it difficult to achieve accurately graduated control of fluid flow from the primary chamber to the secondary chamber and, moreover, results in excessive wear on the parts of the regulator.

The present invention solves this second conflict by providing what may be regarded as two stages of responsiveness on the part of the inlet valve corresponding to two ranges of fuel demand. With decreasing pressure at the engine intake or carburetor conforming to increase in the fuel demand of the engine, the pressure in the secondary chamber progressively drops below atmospheric pressure. As the pressure in the primary chamber initially drops down through an upper range of subatmospheric pressures corresponding to a low range of fuel demands, the inlet valve responds by opening progressively for increasing admission of fuel into the primary chamber. As the fuel demand continues to rise, the pressure in the secondary chamber drops into a lower range of subatmospheric pressures and supplemental means automatically comes into operation to exert additional valve opening force on the inlet valve. Thus, over the lower range of levels of fuel demand, the inlet valve responds in a proportionate manner to the changes in the secondary chamber pressure but operates with accelerated response when the demand of the engine rises through the higher range.

The desirable result is a normal relatively low pressure differential between the two chambers with a higher pressure differential appearing only when higher fuel demands occur. In the preferred practice of the invention, the higher differential is quite moderate compared to the usual maximum differential in such regulators but the magnitude of the higher differential is not important because it does not exist over the lower range of demand levels where accurate and sensitive control is more highly desirable and more difficult to attain. It is to be noted, moreover, that only the lower pressure differential exists when the demand is cut off completely and only the lower differential opposes the opening of the release valve. Thus, smooth operation in opening the release valve is facilitated not only by the dual construction of the valve, as heretofore explained, but also by the provision of a minimum pressure differential across the closed valve. In a preferred practice of the invention, this minimum pressure differential may, for example, be on the order of magnitude of one pound per square inch above atmospheric pressure.

A third conflict arises with respect to the requirement for fuel at a minimum rate for idling the engine and the requirement for accurately metering fuel over a low range of fuel demands above this minimum demand. It has been found that in constructing a release valve for automatic graduated regulation of fuel flow over a low range of engine demands, it is not feasible to make the valve responsive to the extremely low minimum demand of the idling engine. There is an inherent conflict between the sensitivity of valve responsiveness needed for accurate control over the range and the steepness of the response curve required to include the minimum fuel rate for an idling engine. The threshold of responsiveness of the release valve to reduction of pressure in the primary chamber should be above the pressure differential between the two chambers that exists when the engine is idling.

The present invention solves this difficulty by providing a separate valve-controlling arrangement that responds to the vacuum in the intake manifold of the idling engine. This additional means may be a third chamber in communication with the intake manifold together with a bypass from the primary chamber to the secondary chamber under control of the third chamber. A feature of the preferred practice of the invention is the utilization of the previously mentioned auxiliary release valve as such a bypass, the auxiliary release valve thus having two functions and being subject to two separate controls.

In the preferred embodiment of the invention, the primary chamber is separated from the secondary chamber by a first diaphragm that is operatively connected to the inlet valve to close the inlet valve in response to a relatively low pressure differential between the two chambers. The secondary chamber is separated from the atmosphere by a second diaphragm that is operatively connected to the release valve to control flow from the primary chamber to the secondary chamber.

A feature of the preferred construction is the provision of means to operatively connect the second diaphragm to the first diaphragm in response to relatively low pressures in the secondary chamber corresponding to relatively high demand levels of the engine, whereby the second diaphragm exerts pressure on the first diaphragm to accelerate the opening movement of the inlet valve under conditions of peak fuel demand.

The idling bypass, which, as heretofore stated, may comprise the auxiliary release valve, if desired, is operated by a third diaphragm in a third chamber that communicates with the engine intake manifold.

In some forms of the present invention the second diaphragm performs a dual function at idling speeds of the engine in that it is subjected on the side opposite the secondary chamber to the "vacuum" existing in the intake manifold of the engine and in responding to a preselected high "vacuum" will act to close the valve controlling fuel flow from the primary chamber into the secondary chamber. This response of the second diaphragm to idling operation of the engine prevents fuel, in excess of the idling requirements of the engine, from being drawn into the engine and passed therethrough as waste fuel.

The various features and advantages of the regulator may be understood from the following detailed description in conjunction with the accompanying drawings.

In the drawings, which are to be regarded as merely illustrative,

Figure 1 is a cross section of the presently preferred embodiment of the invention taken along the broken line 1—1 of Figure 2;

Figure 2 is a transverse section taken along the line 2—2 of Figure 1 to show the structure in the secondary chamber and also in the third chamber that controls the idling bypass;

Figure 3 is a similar transverse section taken along the line 3—3 of Figure 1 to show the structure in the primary chamber;

Figure 4 is a fragmentary section on a larger scale taken as indicated by the line 4—4 of Figure 3 to reveal the construction of the inlet valve;

Figure 5 is a similar fragmentary section on the line 5—5 of Figure 3 showing the inlet passage communicating with the inlet valve;

Figure 6 is a similar fragmentary section along the line 6—6 of Figure 2 showing the construction of the dual release valve;

Figure 7 is a perspective view of the regulator with one of the side plates removed to reveal the construction of a cooling chamber incorporated in the regulator construction;

Figure 8 is a fragmentary section taken along the line 8—8 of Figure 1;

Figure 9:
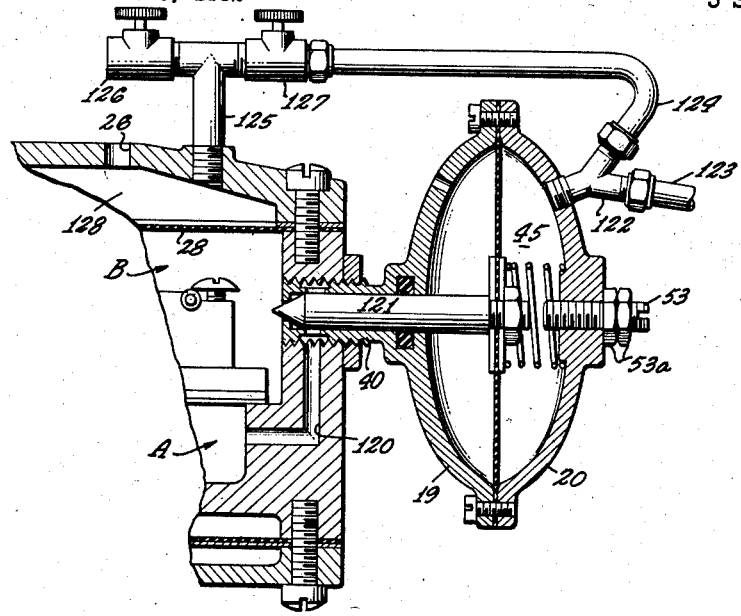
Figure 9 is a fragmentary section showing a modified form of the regulator of the present invention.

The principal parts of the presently preferred embodiment of the invention illustrated in Figures 1 to 8 includes the following: a primary chamber designated A; a secondary chamber B; a heating chamber C, all shown in cross-section in Figure 1; an idler control D shown in Figure 1; an inlet valve generally designated 10, shown in Figures 3, 4 and 5; and a dual release valve generally designated 11, shown in Figures 1, 2 and 6; and an inlet valve booster generally designated 12 shown in Figures 1 and 2.

In the present construction, the body structure of the regulator comprises the following separate parts; a casing body 15, a cover plate 16 on one side of the casing body, an inner wall member 17, a second cover plate 18 on the other side of the casing body, and two dished wall members 19 and 20 forming the separate idler control D.

As shown in Figure 1, the inner wall member 17, which is attached to the casing body 15 by suitable screws 23 (Figure 2), is formed with a large circular aperture 24 and cooperates with the casing body to secure a flexible diaphragm 25. This diaphragm, which will be referred to as the first diaphragm, also serves as a sealing gasket between the primary chamber A and the secondary chamber B.

The side cover 16 which is formed with a port 26 for communication with the atmosphere is mounted on the casing body 15 by suitable screws 27 and cooperates therewith to secure a flexible membrane 28 which will be referred to as the second diaphragm. This second diaphragm also serves as a sealing gasket for the secondary chamber B. It will be noted that the area of the second diaphragm 28 exposed to the pressure of the secondary chamber B is substantially larger than the area of the first diaphragm 25 exposed to the secondary chamber by the circular aperture 24.

The second side cover 18 is mounted on the other side of the casing body 15 by suitable screws 30 with at least one interposed sealing gasket 31. The gasket 31 spans the casing body to form one wall of the heating chamber C. As shown in Figures 1 and 7, the casing body 15 is formed with a plurality of staggered ribs 32 which serve as staggered baffles in the heating chamber C to cause tortuous fluid flow therein. Heated water supplied by the cooling system of the engine enters the heating chamber C through a port 33, as indicated in Figure 7, and follows the tortuous path indicated by the arrows to reach an outlet port 34 for return to the engine cooling system. Thus, the cooling system of the engine warms the regulator and the regulator in turn assists in cooling the engine by heat transfer from the heated water to the fluid fuel passing through the regulator.

The dished wall member 19 of the idler control D is formed with a nipple 40 for mounting on the casing body 15 in communication with the secondary chamber B. The dished wall member 19 is connected to the complementary dished wall member 20 by suitable screws 41 which secure the margin of a suitable diaphragm 42 that divides the idler control into two compartments. One of the two compartments 43 is in communication with the atmosphere through an aperture 44 and the other compartment 45, which may be termed a bypass control chamber, has a control port in communication with the intake manifold of the engine through a metal tube 46.

An operating plunger 49 slidably mounted in the nipple 40 terminates at its outer end in a reduced portion 50 passed through an opening in a diaphragm 42. The reduced portion carries a pair of sealing elements, disposed on opposite sides of the diaphragm, and a nut for clamping the diaphragm together with the two sealing members against the shoulder formed by the reduced portion 50 of the plunger. A resilient sealing ring 51 carried by the wall member 19 and circumscribing the plunger 49 is used to prevent leakage of fluid from the secondary chamber B into the chamber 43. The extreme inner end of the control plunger 49 is formed as oppositely directed conical cams 52 for by-pass control as will be hereinafter explained.

A set screw 53 is threadedly carried by the wall member 20 and coaxially aligned with the plunger 49 to limit the movement of the plunger 49 in the rightward direction as viewed in Figure 2. The set screw 53 carries a pair of nuts 53a to hold the set screw against accidental rotation once it has been moved to a desired position of adjustment. Preferably a suitable helical spring 54 is in compression between the diaphragm 42 and the inner surface of the wall member 20 to bias the plunger to a preselected position.

As shown in Figures 3 and 5, the casing body 15 has a threaded opening 60 to receive a suitable fitting 61 by means of which the regulator may be connected to a suitable source of pressurized fuel such as butane or propane. The threaded opening 60 communicates with a bore or passage 62 which leads to an inlet port 63 for the primary chamber A. The casing body 15 also has a port 64 in communication with the secondary chamber B, port 64 being threaded for communication with the intake of an engine to supply fuel to the engine in response to sub-atmospheric pressure at the engine intake.

The inlet valve 10 includes a rubber-like valve member 65 which is mounted on a suitable lever 66 for movement into and out of the closed position shown in Figures 4 and 5 for sealing the inlet port 63. The lever 66 fixedly mounted on a pivot pin 67 which is journaled in two ears 68 and preferably is surrounded by a coiled spring 69. The spring 69 abuts against a collar or flange 70 on the pivot pin to have a light retarding effect on rotation of the pivot pin and thus prevents vibration of the arm 66. The lever 66 is operatively connected to the first diaphragm 25 by a suitable screw 71 that extends through a pair of discs 72 and 73 on opposite sides of the diaphragm as best shown in Figure 4. Preferably, a light coiled spring 74 continually exerts pressure on the lever 66 in a direction to tend to open the inlet valve in opposition to the pressure in the primary chamber that acts on the diaphragm 25 in a direction to tend to close the valve.

It might be well to mention at this point that the pivot pin 67 is inserted through an opening formed in the casing body, which opening is closed by a threaded plug 75.

The opening closed by the plug 75 permits attachment of a suitable gauge to read pressures within the primary chamber A. After the pressure has been measured the plug 75 is returned to its position closing the opening and this plug is normally left in place during the use of the regulator.

It will be noted in Figure 3 that the casing body 15 is formed with a plurality of relatively deep ribs 77 which form a tortuous passage for fluid flow in the primary chamber A from the inlet port 10 to the region of the release valve 11. This arrangement provides maximum opportunity for the fuel passing through the primary chamber to pick up heat by conduction from the heating chamber C.

As heretofore indicated, preferably the release valve 11 comprises a main release valve and an auxiliary release valve. In the present construction, the main release valve, as best shown in Figure 1, includes a valve member having a disc-shaped head 80 and a tubular stem 81. The head 80 cooperates with an annular valve seat member 82 of suitable rubber-like material that is mounted in a circular recess 83 in the inner wall member 17. The valve seat member surrounds a relatively large port 84 through which fluid flows from the primary chamber A to the secondary chamber B. It will be noted that the disc-shaped valve head 80 provides a relatively large area for response to pressure in the primary chamber A so that the valve tends to seal shut when closed. Preferably, suitable mechanical means is provided to urge the main release valve to its closed position so that the fluid pressure can become effective. For this purpose, a relatively light spring 87 is shown mounted on the face of the inner wall member 17 by a suitable screw 88, the spring engaging the main release valve as indicated in Figure 6 to urge the valve head 80 upward against the valve seat member 82.

The lower end of the tubular valve stem 81, as viewed in Figures 1 and 6, serves as a valve seat for an auxiliary valve member 90 having a conical valve head 91 and a relatively long stem 92 that extends upward through and beyond the tubular stem 81. Here again, the pressure in the primary chamber A tends to maintain the auxiliary valve member 90 in its closed position.

The upper end of the valve stem 92, as viewed in Figure 1, is operatively connected to a lever 95 that is in turn operatively connected to the second diaphragm 28. As shown in Figures 1 and 8, the lever 95 may be connected to the diaphragm 28 by means of a wire clip 96 that extends through two thin metal discs 97 and 98 on opposite sides of the diaphragm. As best shown in Figure 2, the wire lever 95 is bent to an angle to journal in a bearing 100, which bearing may be of split construction with the two parts held together by a suitable screw 101. Preferably, the wire lever is extended beyond the bearing 100 to provide a hook-shaped arm 102 positioned at its outer end for engagement with the conical cam 52 on the end of the previously described idling control plunger 49.

It is desirable in a regulator of this kind to provide some kind of safety valve in the event that failure on the part of the inlet valve 10 permits a dangerous rise of pressure in the primary chamber A. As shown in Figure 2, the wall member 17 may be bored for this purpose and the bore may be normally closed by a small ball member 105. The ball member 105 may be normally held in place by a suitable leaf spring 106, the leaf spring 106 being held anchored by a suitable screw 107. A portion of the diaphragm 25 in the region of the ball member 105 is cut away to avoid blocking flow through the safety valve.

The booster means 12 for exerting opening force on the inlet valve 10 in the second stage of operation of the inlet valve thereby to meet relatively high fuel demands may be in the form of a blade-shaped lever 112. The lever 112 is mounted on a suitable pivot pin 113, which pivot pin in turn is journalled in a pair of ears 114. The swinging end of the lever 112 is in the path of movement of the second diaphragm 28 in the region of the clip 96 that joins the second diaphragm to the wire lever 95. A suitable screw 117 is mounted in the lever 112 and is adjustably secured therein by a suitable lock nut 118, the screw being positioned to move against the upper disc 72 on the first diaphragm 25.

The various parts operatively associated with the second diaphragm 28 are dimensioned and arranged for the following sequence of functions as the diaphragm flexes inward in response to drop in pressure in the secondary chamber B relative to the external atmospheric pressure. First, the diaphragm 28 acting through the wire lever 95 opens the auxiliary release valve by shifting the auxiliary valve member 90 downward. With continued inward flexure of the diaphragm 28, the wire lever 95 swings downward against the upper end of the tubular valve stem 81 to force the head 80 of the main release valve into open position. Finally, with continued inward flexure, the diaphragm 28 transmits pressure to the swinging end of the blade-shaped lever 112 to cause the screw 117 carried by the lever to exert pressure against the first diaphragm 25 thereby to cause opening action on the part of the inlet valve 10.

The operation of the regulator may be readily understood from the foregoing description. Preferably, but not necessarily, the regulator is mounted with the two cover plates 16 and 18 more or less vertical and the idler control D uppermost. When the engine supplied by the regulator is not running, pressure in the secondary chamber B is atmospheric pressure and the second diaphragm 28 is at the normal nonoperating position shown in Figure 1. The responsiveness of the inlet valve 10 to the first diaphragm 25 is such that the prevailing pressure in the primary chamber A at this time is on the order of 1 lb. When the engine associated with the regulator is started and thereby creates a drop in pressure at its carburetion intake because of the increased air flow, the initial result in drop in pressure in the secondary chamber B causes inward flexure of the secondary diaphragm 28, which inward flexure varies with the demand for fuel as created by movement of the air throttle valve.

The initial inward flexure of the diaphragm 28 unseats the auxiliary release valve member 90 with two results. The first result is lowering of the pressure differential between the primary chamber A and the secondary chamber B by virtue of escape of fluid through the auxiliary valve. The second effect is the local reduction of pressure in the region of the main valve head 80 by virtue of the pressure reducing effect of the high velocity stream through the auxiliary valve. These two effects reduce the resistance to opening action on the part of the main release valve so that with continued inward flexure of the diaphragm 28 the main relief valve is readily opened by impingement of the wire lever 95 against the upper end of the tubular valve stem 81.

The resulting reduction of pressure in the primary chamber A causes the first diaphragm 25 to open the inlet valve 10 for the admission of fluid from the high pressure source, the opening action of the inlet valve being assisted by the force of the spring 74. In the lower range of levels of fuel demand by the engine, the flow of fuel is closely regulated by the action of the release valve 11 and the normal reaction of the inlet valve 10 to fluid pressure acting on the diaphragm 25. When the higher range of levels of fuel demand is entered, however, the greater inward flexure of the second diaphragm 28 results in the application of operating pressure by the second diaphragm against the blade shaped lever 12. In this way atmospheric pressure exerted on the second diaphragm 28 is conveyed through the lever 112 to the first diaphragm 25 to boost the opening action of the inlet valve 10. Thus, the inlet valve 10 is governed by the first diaphragm 25 alone over the lower range of fuel demand in such manner as to tend to maintain the normal pressure differential of about 1 lb. between the primary chamber A and the secondary chamber B. In the higher range of fuel demand, however, the boosting effect added by the second diaphragm 28 causes the inlet valve 10 to increase the pressure differential between the two chambers thereby to provide the required higher rate of fuel flow.

If the engine drops to idling speed, the intake pressure is so low that the differential between the secondary chamber B and the atmospheric pressure is too low to hold open the auxiliary release valve, but the idler control D takes over the function of holding open the auxiliary release valve for the required minimum flow. The intake pressure of the idling engine is sufficiently low to operate the diaphragm 42 in the idling control D because the bypass control chamber 45 communicates only with the intake manifold so that the pressure therein will drop lower than in the secondary chamber B. As a result of the relatively low pressure, the diaphragm 42 withdraws the idling control plunger 49 to sufficient extent to cause the conical cam 52 at the inner end of the plunger to act on the hook-shaped arm of the wire lever 95.

Upon analysis, it may be seen that the regulator actually provides four stages of regulation for four different ranges of fuel demand and thus makes possible as accurate and closely graduated control as may be desirable in each of the four ranges. The lowest range of all is the idling range in which the pressure drop in the secondary chamber B is too low to cause effective flexure of the second diaphragm 28 but fuel flow is regulated by the idling control plunger 49. The desired graduated control for idling is provided by the taper of the conical cam 52 at the inner end of the plunger. Normally, the effect of the conical cam 52 when the engine is idling is to open the auxiliary release valve only slightly for steady fuel flow at a relatively low constant rate from the primary chamber A into the secondary chamber B.

In the next higher range of fuel demand, the second diaphragm 28 acting on the wire lever 95 opens the auxiliary release valve more fully for somewhat greater rates of fuel flow into the secondary chamber. When the third higher range of fuel demand is entered, the diaphragm 28 acts on the main release valve to open the port 80 for fluid flow from the primary chamber A to the secondary chamber B. Throughout all three of these stages of fuel demand, increase in fuel flow is accomplished by providing increasingly free communication from the primary chamber A to the secondary chamber B without disturbing the normal tendency of the inlet valve 10 to maintain a relatively low pressure differential between the two chambers. In the fourth and highest range of fuel demand, however, the booster means 12 causes increased fuel supply primarily by exerting opening force on the inlet valve 10 to increase the pressure differential between chambers A and B.

The modification of the preferred embodiment of the invention that is indicated in Figure 9, consists in omitting the previously mentioned hooked arm 102 on the wire lever 95 thus making the auxiliary release valve independent of the idler control D and responsive solely to the second diaphragm 28. Fuel for the idling engine is now supplied through a bypass passage 120 in the wall of the casing body 15, which bypass passage includes the nipple 40 by means of which the idling control D is attached to the casing body. The previously described idler control plunger 49 is replaced in Figure 9 by an idler control plunger 121 which serves as a valve member to control fluid flow through the bypass passage 120.

Thus, when the fuel requirements of the idling engine are too low to flex the second diaphragm 28 to an operative extent, the high vacuum existing in the compartment 45 produces withdrawing movement of the plunger 121 sufficient to permit fuel to flow at the required rate through the bypass passage 120.

An advantage of this second form of the invention is that, in starting the engine, the idler control plunger 121 opens the bypass 120 before the second diaphragm 28 acts on the auxiliary release valve. Thus, the bypass in conjunction with the idler control plunger 121 serves as a relief valve to cause preliminary reduction in pressure in the primary chamber A to facilitate the opening of the auxiliary release valve, which opening action of the auxiliary release valve, in turn, facilitates opening of the main release valve.

In this form of the invention, the wall member 20 has what may be termed a control port carrying a Y-connector 122 to which is connected a conduit 123 leading to the intake manifold of the engine. A second conduit 124 communicates the connector 122 with a T-connector 125 threadedly mounted in the cover plate 16 adjacent the port 26. The head of the T-connector 125 carries adjacent the opposite ends thereof a pair of needle valves 126 and 127 for varying the orifice formed by the bore of the T-connector. It will thus be seen that the auxiliary chamber 128 formed by the diaphragm 28 and the cover plate 16 is thus connected with the intake manifold of the engine and whenever a high vacuum exists, the pressure in the chamber 128 formed by the cover plate 16 and gasket 28 will fall below the pressure within the secondary chamber B. This, as will be understood, will result in deflection of the diaphragm 28 toward the cover plate 16 to close the valve 11 and thus prevent flow of fluid from the primary chamber A to the secondary chamber B. Fluid, however, will still be free to flow through the bypass conduit 120 to supply sufficient fuel to allow idling of the motor.

The needle valves 126 and 127 are provided to permit an adjustment of the amount of air withdrawn from the chamber defined by the cover plate 16 and the diaphragm 28 to meet operation characteristics of different engines.

The purpose of the connection afforded by the conduit 124 is to provide an automatic closing of the valve 11 whenever a high vacuum exists in the intake manifold of the engine. This eliminates the flow of fuel into the engine when the power requirements do not necessitate a supply of fuel to the engine in excess of that required for idling. Thus, for example, when a vehicle equipped with the regulator of the present invention is operated on a downgrade, the high vacuum existing in the engine manifold and producing the upward deflection of the diaphragm 28 closes the valve 11 to eliminate any waste fuel being passed through the engine and not burned therein. Thus, the diaphragm 28 performs two functions in this embodiment of the invention for in the first explained operation of the diaphragm it acts to supply additional fuel, when additional fuel is required, and in the other operation it results in a closing of the valve 11 to prevent flow of the fuel into the secondary chamber other than that flowing through the passage 120 and necessary to idle the engine.

Figure 11:
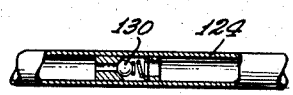
Figure 11 is a fragmentary view illustrating a further modified form of the present invention.

This dual function can also be had by eliminating the needle valves 126 and 127 in the T-connector 125 and mounting a normally closed valve in the conduit 124 which will open to establish communication between the chamber 123 and the chamber 45 whenever the pressure in the chamber 45 falls below a preselected value. Figure 11 illustrates one form of this embodiment of the present invention wherein a spring-pressed ball valve 130 is shown mounted in the conduit 124. The valve 130 normally closes the conduit 124 but will open whenever the pressure differential across the ball exceeds some preselected maximum differential pressure. Whenever a preselected high vacuum exists in the intake manifold of the engine, the ball valve 130 will open to communicate chamber 128 with the chamber 45. The resulting deflection of the diaphragm 28 toward the plate 16 again will close the valve 11 and prevent fuel in excess of idling requirements from entering the secondary chamber and consequently the engine.

My description in specific detail of the presently preferred practice of the invention will suggest to those skilled in the art various changes, substitutions and other departures from the disclosure, that properly lie within the scope and spirit of the appended claims.

Figure 10:
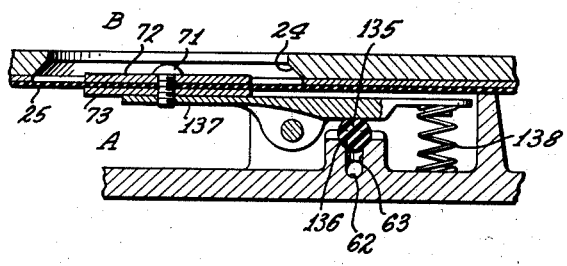
Figure 10 is a fragmentary view showing a modified form of the valve controlling flow of fuel from the primary chamber to the secondary chamber.

For instance, the particular form of many of the elements may be changed without altering in any way the end result of the coaction of the elements. Figure 10 illustrates, for example, a modified form of the inlet valve 10 in which a resilient ball 135 forms the movable element of the valve. In this form of the inlet valve the resilient ball 135 is received within a spherical depression 136 concentric to the inlet port 63 and is urged upwardly in the depression 136 by the pressure of the gas in the passage 62 to bring about an opening movement of the valve.

The position of the ball 135 in the depression 136 is controlled by a lever 137 which is a modified form of the lever 66 and is mounted on a pivot pin, not shown, identical to the pin 67 of the earlier described form of the valve. Here again the lever 137 is intended to be operatively connected to the first diaphragm 25 by a screw identical to the screw 71. Furthermore, a light spring, here identified by the character 138, continually exerts pressure on the lever 137 in a direction to tend to move the lever out of engagement with the ball 135. Thus the spring 138, like the spring 74, exerts pressure on the lever 137 to open the inlet valve in opposition to the pressure in the primary chamber that acts on the diaphragm 25 in a direction to tend to close the valve. The position of the lever 137 thus controls the position of the ball 135 in the recess or depression 136 and consequently controls the inlet flow of the gas into the primary chamber.

It should be clear that although the now preferred embodiments of the present invention have been shown and described herein, it is to be understood that the invention is not to be limited thereto, for it is susceptible to changes in form and detail within the scope of the appended claims.

I claim as my invention:

1. A regulator of the character described for regulating flow of fluid from its inlet port which is connected to a high pressure source to its outlet port which is connected to a fluid-consuming device having a suction intake, said regulator comprising: a primary chamber having said inlet port; a secondary chamber having a release port in communication with said primary chamber and also having said outlet port; an inlet valve in the path of flow through said inlet port to control flow therethrough; a release valve in the path of flow through said release port to control flow therethrough; a first means to close said release valve in response to a pressure in said secondary chamber of a given magnitude relative to atmospheric pressure and to open the release valve in response to drop in said relative pressure below said given magnitude; a second means to close said inlet valve in response to a pressure differential of a given magnitude in said primary chamber over the pressure in said secondary chamber and to open the inlet valve in response to drop of said differential from said given magnitude whereby the inlet valve tends to maintain said magnitude of differential pressure over an upper range of subatmospheric pressures in said secondary chamber; and a third means to exert opening force on said inlet valve in response to relatively large drop in pressure in said secondary chamber relative to atmospheric pressure thereby to cause a relatively high rate of passing through said inlet in response to a high demand of flow through said outlet.

2. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a primary chamber having said inlet port; a secondary chamber having a release port in communication with said primary chamber and also having said outlet port; an inlet valve in the path of flow through said inlet port to control flow therethrough; a release valve in the path of flow through said release port to control flow therethrough; a first means to close said release valve in response to a pressure in said secondary chamber of a given magnitude relative to atmospheric pressure and to open the release valve in response to drop in said relative pressure below said given magnitude; a second means to close said inlet valve in response to a pressure differential of a given magnitude in said primary chamber over the pressure in said secondary chamber and to open the inlet valve in response to drop of said differential from said given magnitude whereby the inlet valve tends to maintain said magnitude of differential pressure over an upper range of subatmospheric pressures in said secondary chamber; a third means to exert opening force on said inlet valve in response to relatively large drop in pressure in said secondary chamber relative to atmospheric pressure thereby to cause a relatively high rate of flow passing through said inlet in response to a high demand of flow through said outlet a by-pass from said primary chamber to said secondary chamber; and a fourth means responsive to a relatively high vacuum at said control port to open said by-pass.

3. A regulator as set forth in claim 2 which includes means responsive to a relatively high vacuum at said control port to hold said release valve closed while said by-pass is open regardless of drop in pressure in said secondary chamber relative to atmospheric pressure.

4. A regulator as set forth in claim 1 in which said release valve comprises a main valve and an auxiliary valve both of which tend to stay closed in response to pressure in said primary chamber; and in which said first means is adapted to open said auxiliary valve in advance of the main valve.

5. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a primary chamber having said inlet port; a secondary chamber having said outlet port; an inlet valve in the path of flow through said inlet port to control flow therethrough; means directly responsive to a relatively high vacuum at said control port to provide a minimum freedom of fluid flow from said primary chamber to said secondary chamber to meet a minimum level of demand; means responsive to drop in pressure in said secondary chamber relative to atmospheric pressure to provide greater freedom for fluid flow from said primary chamber into said secondary chamber over a relatively low range of levels of demand above said minimum level; means responsive to a further drop in pressure in said secondary chamber relative to atmospheric pressure to provide still greater freedom for fluid flow from said primary chamber into said secondary chamber over a higher range of demand levels than said last mentioned range; means responsive to the pressures in said primary chamber and said secondary chamber to operate said inlet valve to tend to maintain a pressure differential of a given magnitude in said primary chamber over the pressure in said secondary chamber; and means to exert opening force on said inlet valve to increase said pressure differential above said given magnitude for increasing the rate of flow from said primary chamber to said secondary chamber to meet a maximum range of levels of demand higher than the previously mentioned ranges.

6. A regulator of the character described for regulating flow of fluid from its inlet port which is connected to a high pressure source to its outlet port which is connected to a fluid-consuming device having a suction intake, said regulator comprising: a primary chamber having said inlet port and a second port for release of fluid from the chamber; an inlet valve in the path of flow through said inlet port to control flow therethrough; a secondary chamber in communication with said second port to receive fluid from said primary chamber, said secondary chamber having said outlet port; a release valve to control flow through said second port into said secondary chamber, said release valve being responsive to drop in pressure in the secondary chamber relative to atmospheric pressure to open when the secondary chamber pressure lowers and to close when the secondary chamber pressure rises; means to operate said inlet valve in response to pressure in said primary chamber relative to pressure in said secondary chamber; and means responsive to excessive lowering of pressure in said secondary chamber to exert opening force on said inlet valve to increase the flow through said inlet port.

7. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a primary chamber having said inlet port and a second port for release of fluid from the chamber; an inlet valve in the path of flow through said inlet port to control flow therethrough; a secondary chamber in communication with said second port to receive fluid from said primary chamber, said secondary chamber having said outlet port; a release valve to control flow through said second port into said secondary chamber, said release valve being responsive to drop in pressure in the secondary chamber relative to atmospheric pressure to open when the secondary chamber pressure lowers and to close when the secondary chamber pressure rises; means to operate said inlet valve in response to pressure in said primary chamber relative to pressure in said secondary chamber; means responsive to excessive lowering of pressure in said secondary chamber to exert opening force on said inlet valve to increase the flow through said inlet port; a by-pass from said primary chamber to said secondary chamber; and means responsive to a drop in pressure at said control port to open said by-pass.

8. A regulator as set forth in claim 7 in which said by-pass is an auxiliary passage through the structure of said release valve.

9. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a primary chamber having said inlet port and a second port for release of fluid from the chamber; an inlet valve in the path of flow through said inlet port to control flow therethrough; a secondary chamber in communication with said second port to receive fluid from said primary chamber, said secondary chamber having said outlet port; a release valve to control flow through said second port into said secondary chamber, said release valve being responsive to drop in pressure in the secondary chamber relative to atmospheric pressure to open when the secondary chamber pressure lowers and to close when the secondary chamber pressure rises; means to operate said inlet valve in response to pressure in said primary chamber relative to pressure in said secondary chamber; means responsive to excessive lowering of pressure in said secondary chamber to exert opening force on said inlet valve to increase the flow through said inlet port; a by-pass from said primary chamber to said secondary chamber; a third chamber having said control port; and means responsive to lowering of pressure in said third chamber to open said by-pass.

10. A regulator as set forth in claim 6 in which said secondary chamber is formed in part by a diaphragm having its outer side exposed to atmospheric pressure; and in which said release valve operatively responds to movement of said diaphragm.

11. A regulator as set forth in claim 10 in which said means responsive to excessive lowering of pressure in said secondary chamber is operated by said diaphragm.

12. A regulator as set forth in claim 6 in which a diaphragm forms a wall common to both of said chambers and in which said inlet valve is operatively connected therewith to be closed thereby.

13. A regulator as set forth in claim 12 which includes spring means to exert opening force on said inlet valve in opposition to said diaphragm.

14. A regulator as set forth in claim 6 in which a diaphragm forms a wall common to both of said chambers and in which said inlet valve is operatively connected therewith to be closed thereby; and in which said means to exert opening force on said valve functions by pressing against said diaphragm.

15. A regulator as set forth in claim 6 in which said release valve tends to stay closed in response to pressure in said primary chamber and in which said release valve comprises a main valve and a smaller auxiliary valve that opens in advance of the main valve to reduce the pressure in the primary chamber in the region of the main valve.

16. A regulator of the character described for regulating flow of fluid from its inlet port which is connected to a high pressure source to its outlet port which is connected to a fluid-consuming device having a suction intake, said regulator comprising: a primary chamber having said inlet port and a second port for release of fluid from the chamber; a secondary chamber in communication with said second port to receive fluid from said primary chamber, said secondary chamber having said outlet port; a first diaphragm separating said two chambers and responsive to the relative pressures in the two chambers; an inlet valve in the path of flow through said inlet port to control flow therethrough, said inlet valve being operatively connected with said diaphragm to close in response to a predetermined pressure in said primary chamber relative to pressure in said secondary chamber; a second diaphragm forming a portion of the wall of said secondary chamber, said second diaphragm being exposed to the atmosphere on its outer side to respond to pressure in said secondary chamber relative to atmospheric pressure; a release valve in the path of flow through said second port into said second chamber to control flow therethrough, said release valve being operatively connected with said second diaphragm to open in response to subatmospheric pressure in the secondary chamber; and means to transmit pressure from said second diaphragm to said first diaphragm in opposition to pressure in said primary chamber thereby to exert opening force on said inlet valve to meet peak demand levels.

17. A regulator as set forth in claim 16 in which said second diaphragm has a substantially larger area than said first diaphragm.

18. A regulator as set forth in claim 17 in which said pressure transmitting means includes a force multiplying lever.

19. A regulator of the character described for regulating flow of fluid from its inlet port which is connected to a high pressure source to its outlet port which is connected to a fluid-consuming device having a suction intake, said regulator comprising: a primary chamber having said inlet port and a second port for release of fluid from the chamber; a secondary chamber in communication with said second port to receive fluid from said primary chamber, said secondary chamber having said outlet port; a first diaphragm separating said two chambers and responsive to the relative pressures in the two chambers; an inlet valve in the path of flow through said inlet port to control flow therethrough; a lever in said primary chamber operatively connecting said diaphragm with said inlet valve to close the valve in response to relatively high pressure in said primary chamber; a second diaphragm forming a portion of the wall of said secondary chamber, said second diaphragm being exposed to the atmosphere on its outer side to respond to pressure in said secondary chamber relative to atmospheric pressure; a release valve in the path of flow through said second port into said second chamber to control flow therethrough; a lever in said secondary chamber operatively connecting said second diaphragm to said release valve to open the release valve in response to drop of pressure in said secondary chamber below atmospheric pressure; and a force multiplying lever to transmit pressure from said second diaphragm to said first diaphragm in opposition to pressure in said primary chamber thereby to exert opening force on said inlet valve to meet peak demand levels.

20. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a casing; a primary chamber in said casing having said inlet port; a secondary chamber in said casing having a release port in communication with said first chamber and having said outlet port; an inlet valve in the path of flow through said inlet port to control flow therethrough; a release valve in the path of flow through said release port to control flow therethrough; an auxiliary chamber formed between the casing wall and said secondary chamber in communication with the atmosphere; a first means to close said release valve in response to pressure in said secondary chamber of a given magnitude relative to pressure in said auxiliary chamber and to open the release valve in response to drop in said relative pressure below said given magnitude; a second means to close said inlet valve in response to a pressure differential of a given magnitude in said primary chamber over the pressure in said secondary chamber and to open the inlet valve in response to drop of said differential from said given magnitude whereby the inlet valve tends to maintain said magnitude of differential pressure; a by-pass from said primary chamber to said secondary chamber; means to open said by-pass to supply fluid at a relatively low rate of flow through said outlet; and means responsive to a relatively high vacuum at said control port to place said auxiliary chamber in communication with the control port to reduce the pressure in the auxiliary chamber below atmospheric pressure thereby to cause said first means to hold said release valve closed.

21. A combination as set forth in claim 20 in which said auxiliary chamber has a port in communication with said control port with sufficient restriction of air flow from the auxiliary chamber to prevent a high vacuum at said control port from lowering the pressure in the auxiliary chamber substantially below atmospheric pressure.

22. A combination as set forth in claim 21 which includes an adjustable valve means to variably restrict air flow from the auxiliary chamber.

23. A combination as set forth in claim 20 in which said auxiliary chamber has a port in communication with said control port and in which flow through said auxiliary chamber port is controlled by a check valve, said check valve being spring loaded to open in response to a predetermined pressure drop at said control port relative to the pressure in the auxiliary chamber.

24. A regulator of the character described for regulating flow of fluid from its inlet port which is connected to a high pressure source to its outlet port which is connected to a fluid-consuming device having a suction intake and an intake manifold, the regulation in flow involving changes in pressure at a control port of the regulator which is connected to said manifold, said regulator comprising: a primary chamber having said inlet port; a secondary chamber having a release port in communication with said first chamber and having said outlet port; an inlet valve in the path of flow through said inlet port to control flow therethrough; a release valve in the path of flow through said release port to control flow therethrough; a first means to control said release valve and to open the release valve in response to a fluid demand above a minimum fuel demand; a second means to close said inlet valve in response to a pressure differential of a given magnitude in said primary chamber over the pressure in said secondary chamber and to open the inlet valve in response to drop of said differential from said given magnitude whereby the inlet valve tends to maintain said magnitude of differential pressure; a normally closed by-pass from said primary chamber to said secondary chamber; and means to open said by-pass in response to a relatively high vacuum at said control port.

References Cited in the file of this patent

UNITED STATES PATENTS

| | | |
|---|---|---|
| 573,213 | Fuller | Dec. 15, 1896 |
| 1,728,500 | Martorell | Sept. 17, 1929 |
| 2,002,884 | Deming | May 28, 1935 |
| 2,240,846 | Hanson | May 6, 1941 |
| 2,314,580 | Garretson | Mar. 23, 1943 |
| 2,475,086 | Ensign | July 5, 1949 |

FOREIGN PATENTS

| | | |
|---|---|---|
| 1,005,291 | France | Dec. 19, 1951 |